March 28, 1961 E. HARTER 2,977,036
WORK FEEDING MEANS FOR MACHINE TOOLS
Filed Sept. 23, 1957 3 Sheets-Sheet 1

Inventor:
Edward Harter
by:
Michael S. Striker
Attorney

March 28, 1961  E. HARTER  2,977,036
WORK FEEDING MEANS FOR MACHINE TOOLS
Filed Sept. 23, 1957   3 Sheets-Sheet 2

Inventor:
Edward Harter
by: Michael S. Striker
Attorney

March 28, 1961  E. HARTER  2,977,036
WORK FEEDING MEANS FOR MACHINE TOOLS
Filed Sept. 23, 1957  3 Sheets-Sheet 3

Inventor:
Edward Harter
by: Michael S. Striker
Attorney

United States Patent Office 2,977,036
Patented Mar. 28, 1961

2,977,036
WORK FEEDING MEANS FOR MACHINE TOOLS
Edward Harter, Birmingham, Mich., assignor to Index-Werke K.G. Hahn & Tessky, Esslingen (Neckar), Germany
Filed Sept. 23, 1957, Ser. No. 685,510
3 Claims. (Cl. 226—89)

The present invention relates to machine tools.

More particularly, the present invention relates to screw machines wherein an elongated rod or the like is fed forwardly in step by step fashion to be worked upon after each of its forward movements.

In such screw machines the elongated workpiece in the form of a rod or the like is conventionally held in its working position by a collet, and a tubular feed tube is provided for feeding the rod forwardly to a predetermined extent after each working cycle is completed. Such a feed tube has springy fingers which resiliently grip the rod or the like, and the feed tube has its springy fingers in constant resilient gripping engagement with the work. As a result, certain difficulties arise when placing a new workpiece into the machine. Because the spring fingers are always in gripping engagement with the work, when a rod or the like is initially moved through the feed tube it is necessary for this rod itself to spread apart the fingers of the feed tube before the rod will move through the collet. This arrangement is of particular disadvantage with long slender rods of small cross section which bend easily because the point at which the rod being placed in the machine is held by the operator is spaced considerably from the springy fingers of the feed tube and thus when such a rod is pushed through the springy fingers on the one hand the rod bends very easily to make the initial positioning of the work very difficult and on the other hand such a rod due to its bending strikes against the inner surface of the feed tube and can injure the feed tube both at its inner surface as well as at its springy fingers.

One of the objects of the present invention is to overcome the above drawbacks by providing a machine tool of the above type into which a workpiece can be introduced in a simple quick manner without requiring the workpiece itself to spread apart the springy fingers of a feed tube.

Another object of the present invention is to provide a structure of the above type which is capable of being quickly and easily actuated so as to place the springy fingers of a feed tube in a position where they are spread apart from each other and cannot grip a workpiece which is being introduced into the machine.

A further object of the present invention is to provide a machine tool of the above type which is capable of being operated either by the hand or by the foot of the operator for placing the springy fingers of a feed tube in a position where they cannot grip the work while it is being initially introduced into the machine.

An additional object of the present invention is to provide a structure capable of accomplishing all of the above objects and at the same time composed of simple and ruggedly constructed elements which are very reliable in operation.

With the above objects in view, the present invention mainly consists of a machine tool which includes a collet for holding a workpiece such as a rod or the like while the workpiece is being worked upon. A feed means resiliently grips the work to feed the latter with respect to the collet means, and in accordance with the present invention a means is provided for placing the feed means in a non-gripping position so that a workpiece such as a rod or the like can be moved freely with respect to the feed means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
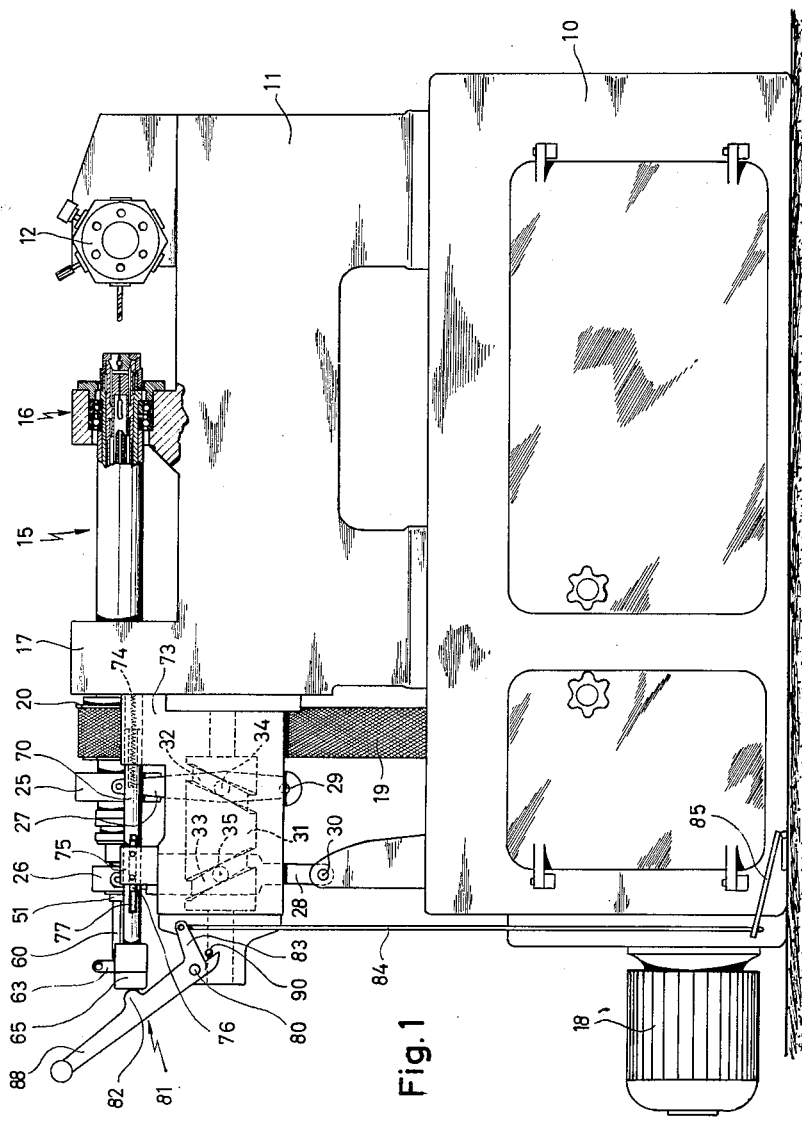
Fig. 1 is a front elevational view of a machine tool according to the present invention.
Figure 2:
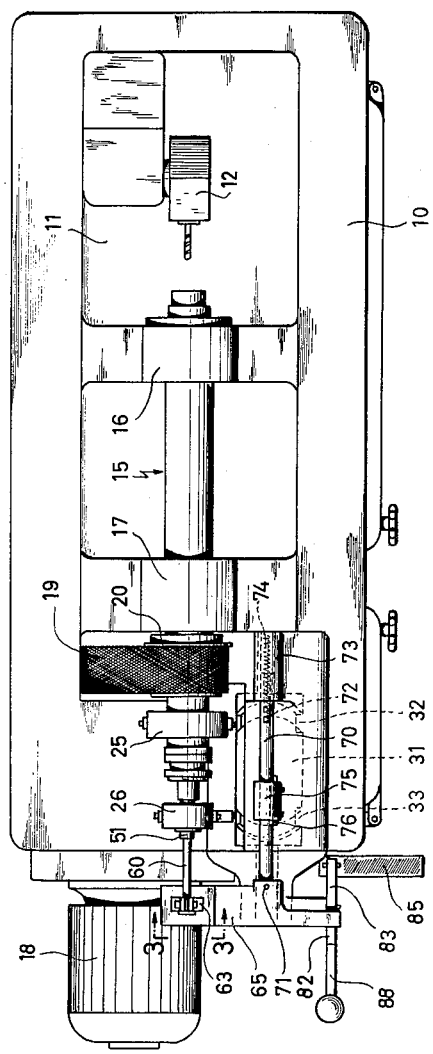
Fig. 2 is a top plan view of the machine tool of Fig. 1.
Figure 3:
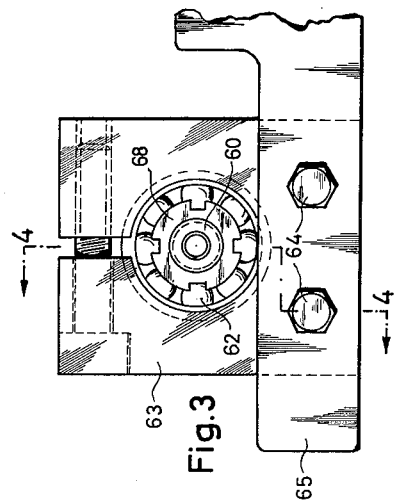
Fig. 3 is a view taken along line 3—3 of Fig. 2 in the direction of the arrows showing the rear end of a structure according to the present invention.
Figure 4:
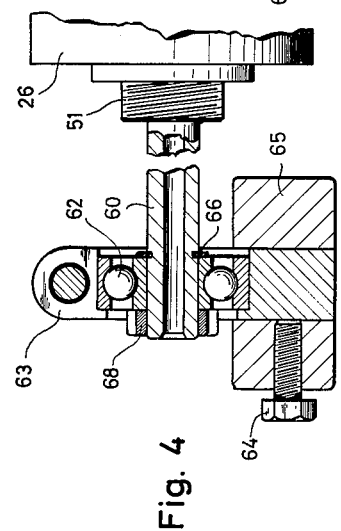
Fig. 4 is a sectional elevational view taken along line 4—4 of Fig. 3 in the direction of the arrow.

Figs. 1 and 2 illustrate an automatic screw machine which includes the structure of the invention. This machine includes a bottom supporting frame 10 which carries an upper supporting frame 11. As is schematically shown in Figs. 1 and 2, the upper frame 11 carries a turret 12. Furthermore, the upper frame 11 rotatably supports an elongated working spindle which is designated in its entirety by the reference character 15. The upper frame 11 includes a front bearing means 16 which rotatably supports the spindle 15 adjacent its front end and a rear bearing means 17 which rotatably supports the rear end of the spindle 15. The spindle 15 is driven from a motor 18 carried by the lower supporting frame 10, this motor 18 driving a pulley belt 19 which cooperates with a pulley 20 fixed to the spindle 15 for driving the latter. A collet actuating member 25 is axially shiftable at the rear end of the spindle 15, and a feed tube actuating member 26 is axially shiftable and located to the rear of the collet actuating member 25. The collet actuating member 25 is shifted by a lever 27 while the member 26 is shifted by a lever 28, the lever 27 being pivotally supported on the machine at 29, and the lever 28 being pivotally supported on the machine at 30, as is shown in Fig. 1. The turning movement of the levers 27 and 28 is controlled by a cam drum 31 formed with cam grooves 32 and 33 in which follower rollers 34 and 35 are respectively located, these rollers being respectively rotatably carried by the levers 27 and 28.

The latter structure is purely conventional and the details thereof form no part of the present invention so that they are not described further.

Figure 5:
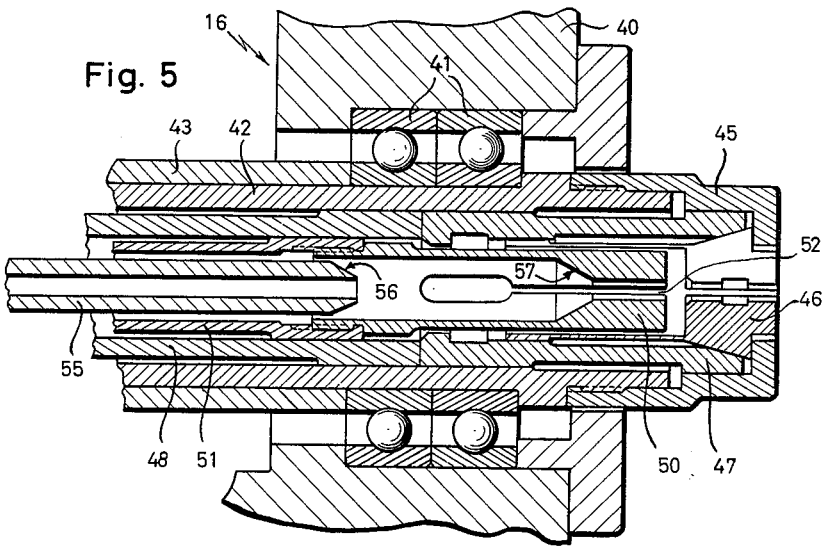
Fig. 5 is a fragmentary sectional view on an enlarged scale showing the details of the front end of the spindle of the machine tool of the invention.
Figure 6:
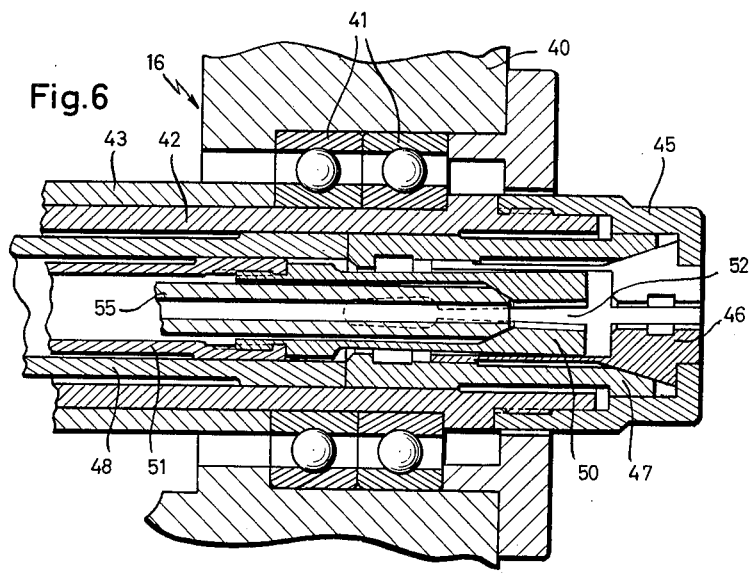
Fig. 6 shows the structure of Fig. 5 in a position different from that of Fig. 5.

The front end of the spindle 15 is shown in section in Fig. 1 and on an enlarged scale in Fig. 5. As may be seen from Fig. 5, the bearing means 15 includes a bearing support 40 which carries a pair of ball bearings 41 in side by side relation, and these ball bearings are connected directly to an inner tube 42 of the spindle 15 so that in this way the latter is rotatably supported by the ball bearings 41. The inner tube 42 of the spindle 15 is encased within an outer tube 43 of the spindle 15, and the front end of the tube 43 abuts against the left end face of the left bearing 41 of Fig. 5. The inner tube 42 threadedly carries a spindle head 45 at the front end of the spindle, and a collet 46 is located within the head 45. The collet 46 is acted upon by a collet actuating head 47 which in turn is acted upon by the elongated tube 48 located within the spindle and shiftable to the right and left by the collet actuating member 25 referred to above. Thus, when the tube 48 is shifted to the right, as viewed in Fig. 5, the actuating head 47 will cause the collet 46 to grip and hold the workpiece so that it will be operated upon, while when the tube 48 is shifted to the left, as viewed in Fig. 5, the collet will be released and will spread apart due to its own resiliency to a releasing position permitting the rod or the like to be advanced forwardly after completion of a working cycle. The collet 46 is shown in Fig. 5 in its operating or gripping position and in Fig. 6 in its rest or non-gripping position.

Coaxially located within the tube 48 as well as the collet actuating head 47 is an elongated feed tube 51 which terminates at its front end in a plurality of springy fingers 50 formed by the axially extending slits 52 extending to the left from the front end of the feed tube, as viewed in Fig. 5. The springy fingers 50 have in the interior of the feed tube 51 rearwardly directed shoulders 57, respectively, these shoulders forming part of a cone, as is evident from Fig. 5. These springy fingers 50 due to their own resiliency resiliently grip the work. When the collet 46 is in its non-gripping position shown in Fig. 6, the member 26 is actuated to shift the feed tube 51 forwardly to the right, as viewed in Fig. 5, and in this way the rod will be advanced forwardly through the collet to the desired extent. Then the element 25 is actuated to cause the collet to grip the work, and after the work is gripped by the collet so as to be held in a position to be worked upon, the feed tube 51 is returned to its starting position, the springy fingers 50 remaining in resilient engagement with the work and being moved backwardly along the work when the feed tube 51 is returned to its rest position while the work is being held by the collet 46.

In accordance with the present invention there is located coaxially in the feed tube 51 an elongated spreader tube means 55 which terminates at its front end in a frusto-conical end 56. The elongated rod which is worked upon passes through the spreader tube 55 as well as through the springy fingers 50 and the collet 46. The spreader tube 55 is shown in its rear rest position in Fig. 5. It is axially shiftable forwardly from the rest position of Fig. 5 to a forward operating position shown in Fig. 6 where the front end 56 of the spreader tube 55 cooperates with the shoulders 57 of the fingers 50 to spread the latter apart from each other in the manner shown in Fig. 6. When the fingers 50 are thus spread apart from each other they engage the inner surface of the collet 46. With the parts in the position of Fig. 6 a new workpiece can be very easily introduced through the tube 55 and collet 46 without being engaged by the springy fingers 50 which are now located by the tube 55 in a non-gripping position. Of course, when the work is introduced into the machine the collet 46 is placed in its non-gripping position shown in Fig. 6.

The structure for actuating the spreader tube means 55 is shown in Figs. 1–4.

As is apparent from Figs. 1 and 2, the spreader tube 55 has a free rear end portion 60 extending rearwardly beyond the feed tube 51. An actuating means is connected to the rear end portion 60 of the spreader tube 55 for shifting the latter between its operating positions, and although this actuating means may be of any desired automatic construction, it is often desirable even with automatic machines that such a spreader tube be shifted by the operator, and in the illustrated example the actuating means is itself operated by the operator of the machine rather than automatically.

The actuating means includes a motion transmitting member 65 in the form of a block 65 extending laterally from the rear end portion 60 of the spreader tube 55, this block 65 extending toward the side of the machine shown in Fig. 1. A pair of screws 64 serve to adjustably fix to the block 65 a bearing carrier 63 which carries a ball bearing 62 connected to the rear end portion 60 of the spreader tube 55, as shown most clearly in Fig. 4. In this way the spreader tube is capable of rotating freely about its axis. A snap ring 66 located in a groove of the tube 55 on one side of the bearing 62 and a nut 68 threadedly carried by the tube 55 and engaging the other side of the bearing serve to fix the tube 55 and the bearing 62 together so that they cannot shift axially one with respect to the other.

As is shown in Figs. 1 and 2, an elongated guide bar 70 is fixed by a pin 71 to the block 65, and this guide bar 70 extends slidably through a bore of a bearing block 75 carried by the machine frame 73, so that the guide rod 70 together with the bearing block 75 which serves to slidably support the guide rod act to guide the block 65 together with the spreader tube 55 for forward and rearward shifting movement. The front end 72 of the guide bar 70 is formed with a bore and extends slidably into a guide bore formed in the frame part 73 of the machine, and within this latter guide bore is located a spring 74 which abuts at one end against a stationary machine part and which extends into the bore of the guide bar 70 to press against the motion transmitting block 65 and the tube 55 to the left, so that in this way a spring means is provided which urges the spreading tube 55 to its rest position shown in Fig. 5. The bearing block 75 fixedly carries a key 76 which is located slidably within an elongated axial groove 77 (Fig. 1), formed in the bar 70, so that the key 76 and groove 77 permit axial shifting of the bar 70 but prevent the latter from turning about its axis.

The means for actuating the spreader tube 55 further includes a manually operable lever 81 which is pivotally supported on the frame part 73 by the pivot pin 80 shown in Fig. 1, this lever 81 having an arm 88 provided with a projection 82 which bears directly against the motion transmitting block 65. The other arm 83 of the lever 81 is pivotally connected to the top end of a connecting rod 84 whose bottom end is connected to a foot pedal 85. With this construction the lever 81 or the foot pedal 85 form a part of the actuating means which is moved by the operator in order to move the motion transmitting member 65 so as to shift the spreader tube 55 to its operating position shown in Fig. 6. The operator can turn the lever 81 in a clockwise direction, as viewed in Fig. 1, in order to move the tube 55 to its operating position, or the operator may press downwardly on the foot pedal 85 to accomplish the same result. Upon release of the hand lever 81 or the foot pedal 85 the spring 74 will return the spreader tube 55 to its rest position. This rest position of the spreader tube 55 is determined by a stop pin 90 (Fig. 1) carried by the frame part 73 and engaged by an extension of the lever 81 in the manner shown in Fig. 1, so that the counterclockwise turning of the lever 81, as viewed in Fig. 1, is limited in this way, and thus the block 65 together with the spreader tube can move to the left, as viewed in Fig. 1, only to the position shown in Fig. 1.

It will be understood that each of the elements described above, or two or more together, may also find a useful application in other types of machine tools differing from the types described above.

While the invention has been illustrated and described as embodied in screw machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various modifications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine tool, in combination, an elongated feed tube having a front end provided with a plurality of springy fingers which resiliently grip a rod to feed the latter; elongated spreader tube means arranged within said feed tube coaxial therewith and through which the rod which is being worked upon passes, said spreader tube means being movable between a rear rest position and a forward operating position where said spreader tube means spreads the springy fingers of said feed tube apart from each other to allow insertion of a new rod into said feed tube without subjecting the rod during insertion to any buckling forces, said spreader tube means extending rearwardly beyond said feed tube and having a free rear end portion; and actuating means operatively connected with said rear free end portion of said spreader tube means for shifting the latter axially between said positions thereof, said actuating means including a motion transmitting member connected to said rear end portion of said spreader tube means, a movable member accessible to the operator so as to be movable by the operator and cooperating with said motion transmitting member for transmitting the movement of said movable member to said motion transmitting member and through the latter to said spreader tube means, and a bearing connecting said spreader tube means to said motion transmitting member and supporting the spreader tube means for free rotation with respect to said motion transmitting member.

2. In a machine tool, in combination, an elongated feed tube having a front end provided with a plurality of springy fingers for resiliently gripping a rod to feed the latter; elongated spreader tube means located coaxially within said feed tube and being shiftable in the latter between a rear rest position and a forward operating position where said spreader tube means spreads the fingers of said feed tube apart from each other so that a new rod may be inserted into said feed tube without subjecting the rod during insertion to any buckling forces, said spreader tube means having a free rear end portion extending rearwardly beyond said feed tube; a block to which the rear end portion of said spreader tube means is rotatably connected, said block extending laterally from said spreader tube means; spring means acting on said block for urging the latter to move to a position which locates said spreader tube means in its rest position; and a lever pivotally supported on the machine and engaging the block for moving the latter together with said spreader tube means forwardly to locate the spreader tube means in its operating position against the action of said spring means.

3. In a machine tool, in combination, an elongated feed tube having a front end provided with a plurality of springy fingers for resiliently gripping a rod to feed the latter; elongated spreader tube means located coaxially within said feed tube and being shiftable in the latter between a rear rest position and a forward operating position where said spreader tube means spreads the fingers of said feed tube apart from each other so that a new rod may be inserted into said feed tube without subjecting the rod during insertion to any buckling forces, said spreader tube means having a free rear end portion extending rearwardly beyond said feed tube; a block to which the rear end portion of said spreader tube means is rotatably connected, said block extending laterally from said spreader tube means; spring means acting on said block for urging the latter to move to a position which locates said spreader tube means in its rest position; a lever pivotally supported on the machine and engaging the block for moving the latter together with said spreader tube means forwardly to locate the spreader tube means in its operating position against the action of said spring means; a connecting rod connected at one end to said lever; and foot pedal means connected to the opposite end of said connecting rod for acting on the latter to turn said lever in a direction which moves said block and spreader tube means forwardly to locate said spreader tube means in its operating position.

References Cited in the file of this patent

UNITED STATES PATENTS

| | | |
|---|---|---|
| 2,155,634 | Baxendale et al. | Apr. 25, 1939 |
| 2,261,378 | Jelinek et al. | Nov. 4, 1941 |
| 2,695,096 | Gridley | Nov. 23, 1954 |

FOREIGN PATENTS

| | | |
|---|---|---|
| 891,672 | France | Dec. 17, 1943 |